United States Patent [19]

Suzuki

[11] Patent Number: 4,750,814

[45] Date of Patent: Jun. 14, 1988

[54] ANTI-DAZZLE SYSTEM FOR A WINDOW GLASS OF A MOTOR VEHICLE

[75] Inventor: Masaru Suzuki, Chiryu, Japan

[73] Assignee: Kabushiki Kaisha Tokai Rika Denki Seisakusho, Aichi, Japan

[21] Appl. No.: 763,915

[22] Filed: Aug. 8, 1985

[30] Foreign Application Priority Data

Aug. 8, 1984 [JP] Japan .................................. 59-167156

[51] Int. Cl.⁴ .......................... G02F 1/133; H05B 1/00
[52] U.S. Cl. ..................................... 350/351; 219/203; 350/276 R
[58] Field of Search ...................... 350/1.6, 351, 331 R, 350/331 T, 276 R–280, 282, 283; 219/203, 522, 548

[56] References Cited

U.S. PATENT DOCUMENTS

| | | | |
|---|---|---|---|
| 1,781,557 | 11/1930 | Reukauf | 350/283 |
| 2,773,162 | 12/1956 | Christensen | 219/203 |
| 3,575,491 | 4/1971 | Heilmeier et al. | 350/267 X |
| 3,590,371 | 6/1971 | Shaw | 219/203 |
| 3,603,672 | 9/1971 | Bastide | 350/280 |
| 3,637,291 | 1/1972 | Kessler et al. | 350/351 |
| 3,700,306 | 10/1972 | Cartmell et al. | 350/341 |
| 3,982,092 | 9/1976 | Marriott | 219/203 |
| 4,029,393 | 6/1977 | Dungan et al. | 350/331 T X |
| 4,461,715 | 7/1984 | Lu et al. | 350/351 |
| 4,506,137 | 3/1985 | Meister | 219/203 |
| 4,583,815 | 4/1986 | Taga et al. | 350/1.6 |
| 4,589,735 | 5/1986 | Saunders et al. | 350/280 X |

FOREIGN PATENT DOCUMENTS 0477797 6/1968 Switzerland .................... 219/203

Primary Examiner—Stanley D. Miller
Assistant Examiner—David Lewis
Attorney, Agent, or Firm—Price, Gess & Ubell

[57] ABSTRACT

An anti-dazzle system for a window glass of a motor vehicle, wherein at least either one of the front and rear surfaces of the window glass embedding an electric wire is provided with a film layer including a heat-sensitive color-changing material, which becomes translucent or so dark a color according to temperatures, thereby to be able to change the color of the window glass for prevention of dazzles.

5 Claims, 1 Drawing Sheet

ANTI-DAZZLE SYSTEM FOR A WINDOW GLASS OF A MOTOR VEHICLE

BACKGROUND OF THE INVENTION

1. Field of the Invention

The present invention relates to an anti-dazzle system for a window glass of a motor vehicle which is designed to take measures, by the utilization of a blur-removing device incorporated into the window glass, against dazzles and heat caused by the sun.

2. Description of the Prior Art

In recent years, there has been a tendency to extend or project a windscreen and a rear glass of a motor vehicle adjacent to the roof portion thereof in order to make the inside of the motor vehicle brighter. However, in the case that the motor vehicle is of the design as described above, an adverse effect has occurred, more particularly, a driver suffers from dazzles and heat, etc. from the sun. Therefore, although some of the windscreens are colored a little darker, to solve the problem in that case, an a problem can occur in that the driver may be apt to lose vision through a windscreen in a tunnel or the like.

SUMMARY OF THE INVENTION

The present invention has been developed with a view to substantially solving the above-described inconvenience inherent in the prior art window glass of motor vehicles and, has for its essential object to provide an improved anti-dazzle system for a window glass of a motor vehicle which is designed to take measures against dazzles caused by sunbeams by the utilization of the temperature rise of an electric wire for a window defogger for use in removal of blurs on the window glass, and according to which the window glass is provided with a heat-sensitive colorchanging material which changes color when the window glass is heated, thereby to adjust the transparency of the sunlight.

In accomplishing this and other objects of the present invention, there is provided an anti-dazzle system for a window glass of a motor vehicle having an electric wire embedded in the window glass and connected to a battery source, so that the window glass is heated when the electric wire is power-supplied, wherein at least either one of the front and rear surfaces of the window glass embedding said electric wire is layered with a film layer which includes a heat-sensitive color-changing material, characterized in that the electric wire embedded in the window glass passes a current of large capacity for removal of blurs, while it passes a current of small capacity to change the color of the window glass for prevention of dazzles.

BRIEF DESCRIPTION OF THE DRAWINGS

This and other objects and features of the present invention will become apparent from the following description taken in conjunction with one preferred embodiment thereof with refeence to the accompanying drawings, in which.

DESCRIPTION OF THE PREFERRED EMBODIMENT

Figure 1:
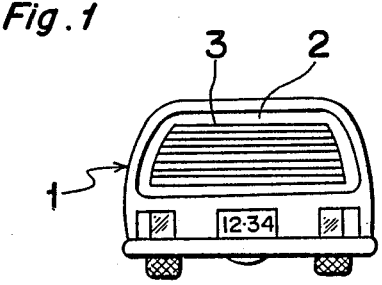
FIG. 1 is a rear view of a motor vehicle embodying the present invention.

Before the description of the present invention proceeds, it is to be noted that like parts are designated by like reference numerals throughout the accompanying drawings.

A glass 4 of a rear window 2 of a motor vehicle 1 has an electric wire 3 embedded therein. The electric wire 3 runs in a horizontal direction of the glass 4 and is spaced at a predetermined interval between the up and down rows. Moreover, the rear face of the glass 4 (that is, the inside face of the glass) is applied with a film layer 5 which includes a heat-sensitive color-changing material.

For a heat-sensitive color-changing material or a heat-sensitive paint included in the film layer 5, a material is used that is transparent or so dim a color that a light can pass through at normal temperatures, and it becomes translucent or so dark a color that the light can hardly pass through when heated. For example, a cholesteric liquid crystal ($C_{27}H_{45}OCOC_nH_{2n+1}$) is used. The cholesteric liquid crystal changes its color in accordance with the change of temperatures, and the temperature at which the cholesteric liquid crystal changes its color can be selectively determined with respect to the kind of the liquid crystal and the mixing ratio thereof. Moreover, the range of the temperatures in which the cholesteric liquid crystal changes its color is 1°-6° C., with high decomposition ability. Therefore, the cholesteric liquid crystal is favorably employed.

If the cholesteric liquid crystal is arranged in such a manner that it shows dim red through which a light can easily pass through at normal temperatures below 35° C., and it changes to be dark purple in the range of the temperatures at 39° C.-44° C., and the electric wire 3 is arranged in such a manner that it is heated up to 40° C. if power-supplied, the cholesteric liquid crystal changes to be dark purple only when the electric wire is power-supplied, and it never changes it color so easily when the ambient temperatures rise or by other reasons. The cholesteric liquid crystal is formed into the film layer 5 by mixing the liquid crystal which is not micro-capsuled in a solution of organic solvent, e.g., cellulose resin, to be applied on the rear surface of the glass 4.

Figure 3:
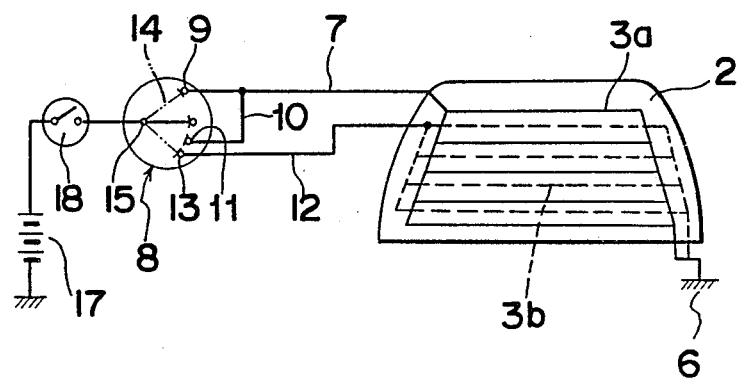
FIG. 3 is a circuit diagram of an electric wire embedded in the window glass of FIG. 2.

As shown in FIG. 3, the electric wire 3 is comprised of two electric wires 3a and 3b which are made by connecting at an interval of one row the electric wire embedded in a parallel relationship to each other. One end of these electric wires 3a and 3b are grounded, and at the same time, the other end of the electric wire 3a is connected through a leading wire 7 to a contact 9, for use in prevention of dazzles, of an operating switch 8 provided near a driver's seat, with a leading wire 10 branched from the leading wire 7 being connected to a contact 11 for defogging of the operating switch 8. On the other hand, the other end of the electric wire 3b is, through a leading wire 12, connected to a contact 13 for defogging, placed adjacent to the contact 11. A switching piece 14 is connected to a contact 15 so as to connect the latter to a battery power source 17 through a key switch 18. When the switching piece 14 is operated from a neutral position shown in the drawing towards the side of the contact 9, it comes into contact with the contact 9, thereby to supply power only to the electric wire 3a. On the contrary, when the switching piece 14 is moved to the position of defogging, the switching piece 14 comes into contact with the contacts 11 and 13, thereby to supply power to both of the electric wires 3a and 3b. In other words, when it is required to remove blurs on tha glass, all of the electric wires are power-supplied. Meanwhile, when it is desired to prevent dazzles, half of the electric wire 3 is power-supplied, and accordingly, the amount of the electric power to be consumed for prevention of dazzles for a long time can be reduced.

According to the construction as described above, in the case where a sunbeam is dazzling in the daytime or a headlight coming from a successive motor vehicle is dazzling, the switching piece 14 is brought into contact with the contact point 9 by the operating switch 8, and consequently, the electric wire 3a is power-supplied to generate heat values of a small capacity which then heat the film layer 5 through the glass 4, thus the heat sensitive color-changing material in the film layer 5 becomes a dark purple or a similar color. Accordingly, the dazzles are reduced or the dazzling degree is lowered. On the other hand, in the case where the window glass is required to be removed of blurs thereon, both of the electric wires 3a and 3b should be power-supplied by switching the operating switch 8 to be connected to the side of contact, so that heat values of large capacity are generated to rapidly heat the glass 4 for prompt removal of blurs.

EMBODIMENT 1

The practical specification of the liquid crystal paint to be used for a window glass of a motor vehicle according to the present invention is as follows:

(1) Liquid crystal paint to be used:

Cholesteric liquid crystal ($C_{27}H_{45}OCOC_nH_{2n+1}$) for low temperatures No. R-4, specifically, a liquid crystal dispersion paint which is formed in the manner that a micro-capsule containing a cholesteric liquid crystal therein is, after being dried, dispersed into an epoxy resin.

(2) Temperature at which the liquid crystal changes color: 40° C.

(3) Color:

At low temperatures (less than 38° C.)—Reddish Yellow

At high temperatures (more than 40° C.)—Red Orange (4) Glass temperature:

When the electric wire is not power-supplied (namely, at low temperatures),

−10° C. (in winter) to +35° C. (in summer)

When the electric heater is power-supplied (namely, at high temperatures), 40° C. to 45° C.

(5) Efficiency of electric wire:

In the case of a window glass . . . 12 V, 150 W (12.5 Å)

Figure 2:
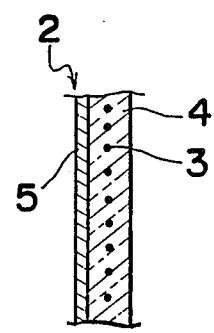
FIG. 2 is a cross sectional view of a window glass of the motor vehicle of FIG. 1.

(6) Structure of the liquid crystal, electric wire and glass:

As shown in FIG. 2.

The present invention is not limited to the foregoing embodiment, but may be applied to various kinds of window glasses such as a windscreen or a door glass other than a rear glass. Further, although the heat capacity can be changed larger or smaller by selection of the number of electric wires to be power-supplied in the above embodiment, instead of this, a resistor may be utilized. That is, it may be so arranged that a circuit which supplies power to the electric wire through the resistor and a circuit which supplies power to the electric wire without passing through the resistor be activated by a switch.

As is clear from the foregoing description, according to an anti-dazzle systemm for a window glass of a motor vehicle of the present invention, since an electric wire is embedded in the glass, the rear face of which is applied with a film layer including a heat-sensitive color-changing material, when the heat-sensitive color-changing material is heated owing to the temperature rise of the electric wire, it becomes translucent or so dark a color that light can hardly pass through. Therefore, it becomes possible to prevent the driver from being dazzled merely through connection of the power-supply to the electric wire. As is described hereinabove, since the anti-dazzle system of the present invention is based on the utilization of the electric wire for removal of blurs, the driver can easily prevent himself from being dazzled, by activating a film layer including a heat-sensitive color-changing material on the glass. Moreover, the anti-dazzle system is advantageous in that it can be put into practice by simple construction and at low cost, and therefore, it is valuable in practical use.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A combination defogger and anti-dazzle system for a window of a motor vehicle, comprising:
    a window of transparent glass;
    a layer of a heat-sensitive color-changing material permanently and operatively connected to at least either one of the front face or rear face of the window and having the characteristic of a relatively narrow range of temperature in which the color-changing material will change color;
    a power source;
    two sets of resistance heater wired embedded in the window; and
    a multi-position switch to provide either a defogging or an anti-dazzle mode, wherein one position connects the power source to only one set of the wires to develop heat sufficient to actuate the color changing material, and another position connects the power source to both sets of wires to develop sufficient heat for a defogging operation of the glass.

2. The invention of claim 1 wherein the color changing material is a layer of cholesteric liquid crystal material having a relatively transparent color phase and a relatively translucent color phase with the transition point occurring at approximately 40° C.

3. The invention of claim 2 wherein the cholesteric liquid crystal material is intermittently dispersed in an epoxy resin coating that is permanently adhered to the window glass.

4. A combination defogger and anti-glare system for a window of a motor vehicle, consisting of:
    a window of transparent glass;
    a pair of resistance heater wires sets embedded in the window;
    a layer of a cholesteric liquid crystal material dispersed in a coating permanently affixed to a surface of the window of a predetermined thickness, the liquid crystal material having a characteristic of changing color at a predetermined temperature from a relatively transparent state to a relatively translucent state, the translucent state providing an anti-glare effect for an operator of the motor vehicle, while still permitting operation of the vehicle;

a source of power connected to the sets of resistance heater wires, and means for connecting one set of resistance heater wires to provide a first temperature at or above the predetermined temperature to activate a color change to provide the anti-glare effect and for connecting both sets of resistance heater wires to provide a second higher temperature for a defogging effect.

5. The invention of claim 4 wherein the means for connecting includes a multi-position switch positioned adjacent the operator of the vehicle.

* * * * *